United States Patent [19]
Tola

[11] Patent Number: 5,049,232
[45] Date of Patent: Sep. 17, 1991

[54] METHOD OF MAKING DIAPHRAGM-TYPE PRESSURE TRANSDUCERS

[75] Inventor: Jeffry Tola, Morrison, Ill.

[73] Assignee: General Electric Company, Fort Wayne, Ind.

[21] Appl. No.: 576,664

[22] Filed: Aug. 31, 1990

[51] Int. Cl.⁵ .......................... B44C 1/22; C23F 1/02
[52] U.S. Cl. .................................. 156/630; 29/621.1;
    156/634; 156/645; 156/656; 156/659.1;
    156/902
[58] Field of Search ............... 156/630, 633, 634, 645,
    156/656, 659.1, 902; 29/609.1, 621.1, 25.35;
    73/720, 721, 726, 727; 338/2, 4, 42

[56] References Cited
U.S. PATENT DOCUMENTS

| | | | |
|---|---|---|---|
| 4,021,766 | 3/1977 | Aine | 338/2 |
| 4,133,100 | 1/1979 | Myhre | 29/621.1 |
| 4,295,116 | 10/1981 | Studlien | 338/4 |
| 4,802,952 | 2/1989 | Kobori et al. | 156/634 |

Primary Examiner—William A. Powell
Attorney, Agent, or Firm—Ralph E. Krisher, Jr.

[57] ABSTRACT

A method of making a plurality of separate pressure transducers of the type comprising a strain gauge circuit bonded to a diaphragm, comprising the steps of providing an array of a plurality of strain gauge circuits formed on a laminate sheet and an array of a plurality of diaphragms corresponding to the array of the strain gauge circuits. The array of strain gauge circuits is aligned with the array of diaphragms. The laminate sheet is bonded to the array of diaphragms, with each strain gauge circuit aligned with a respective diaphragm. Finally, the laminate is cut to form the separate pressure transducers.

30 Claims, 7 Drawing Sheets

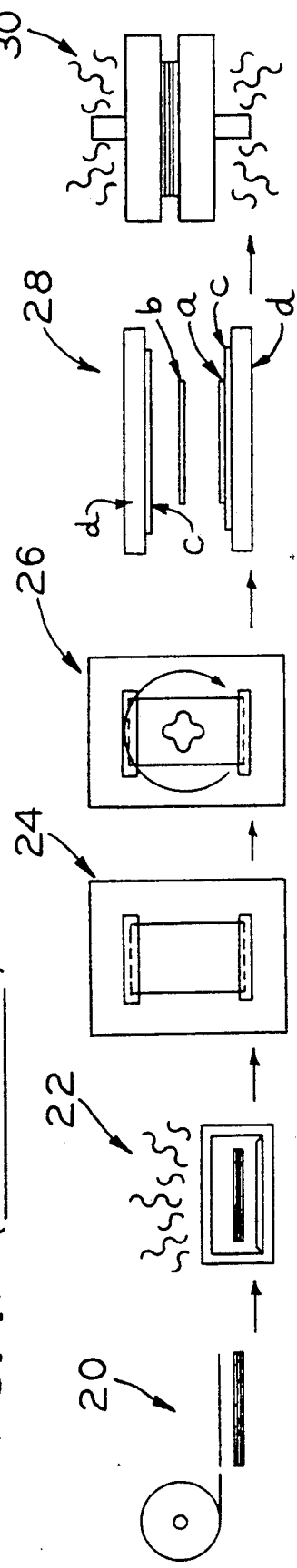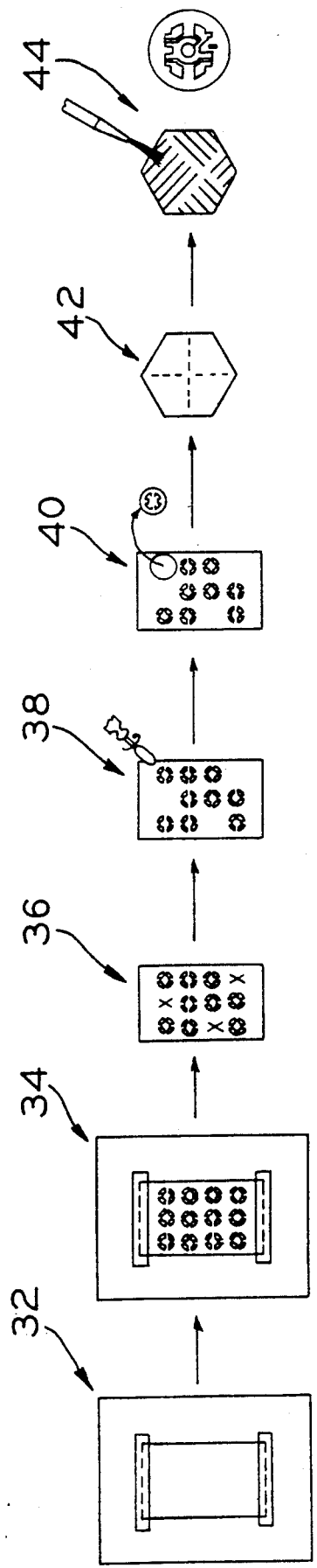

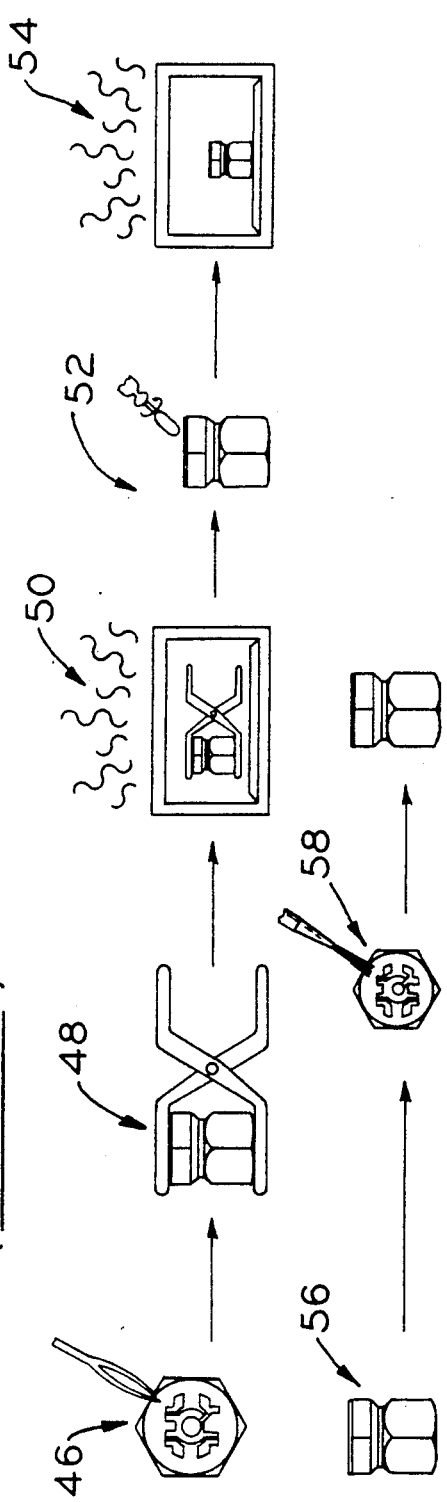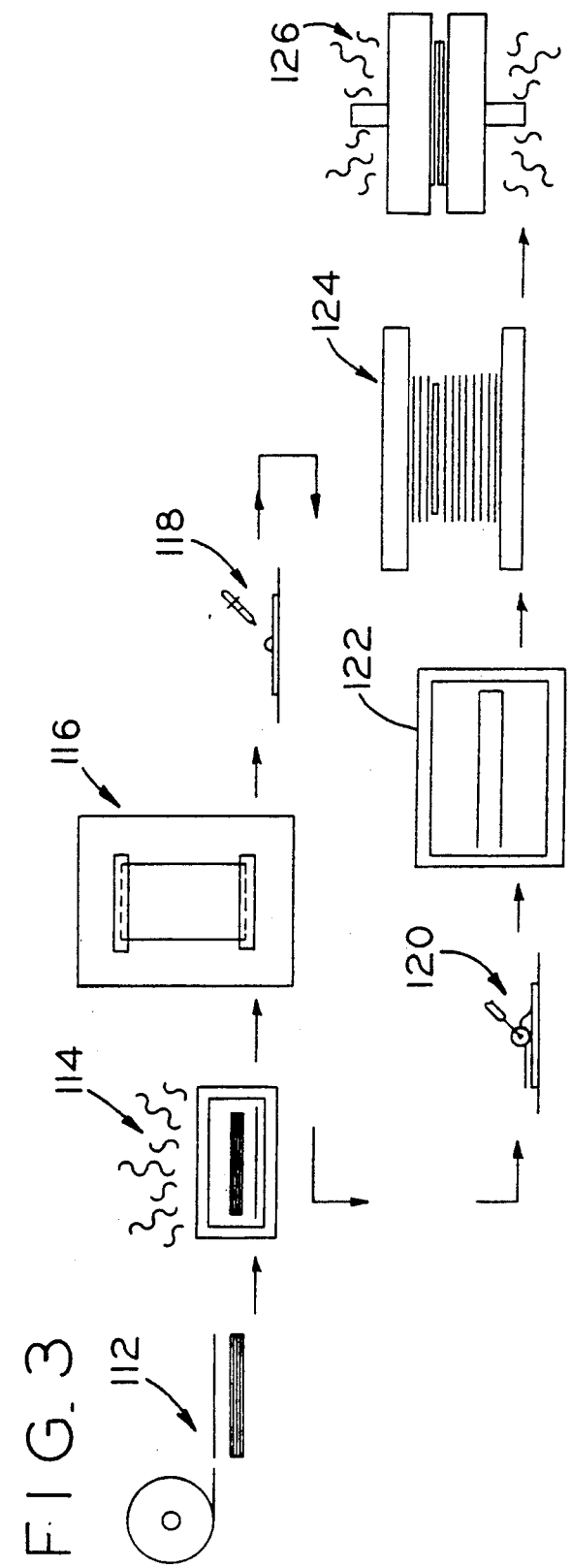

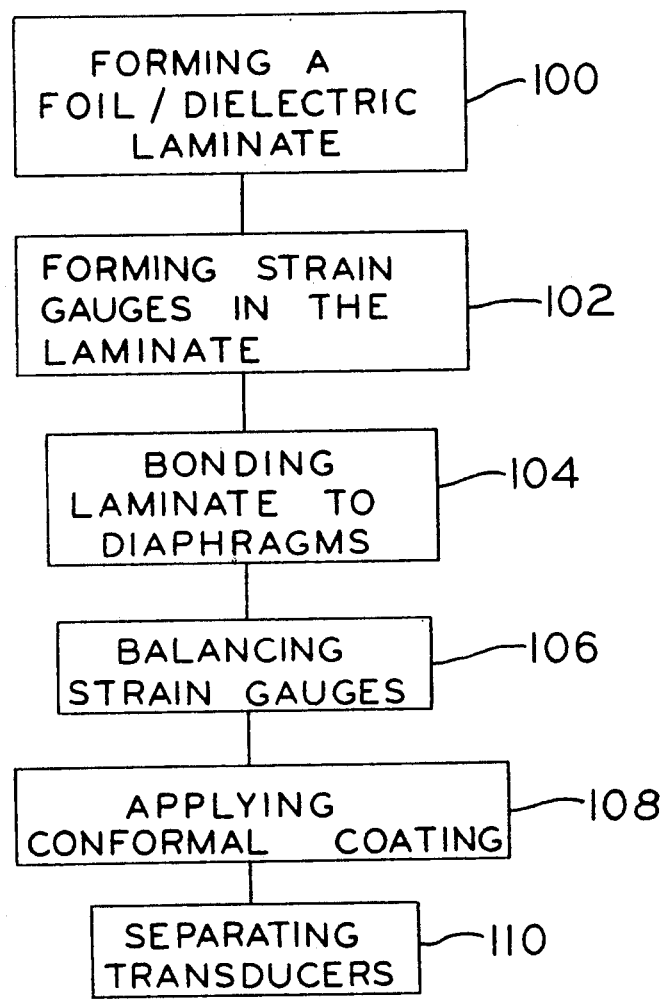
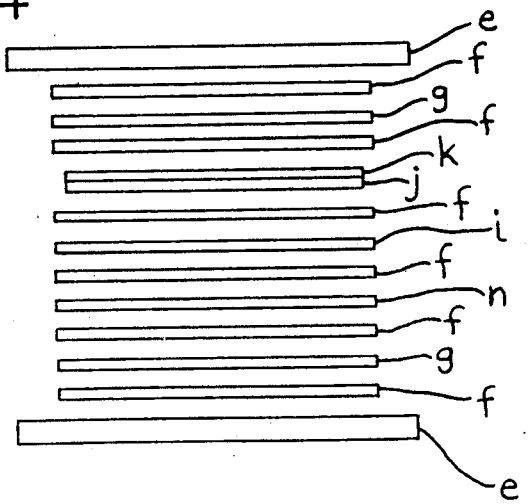

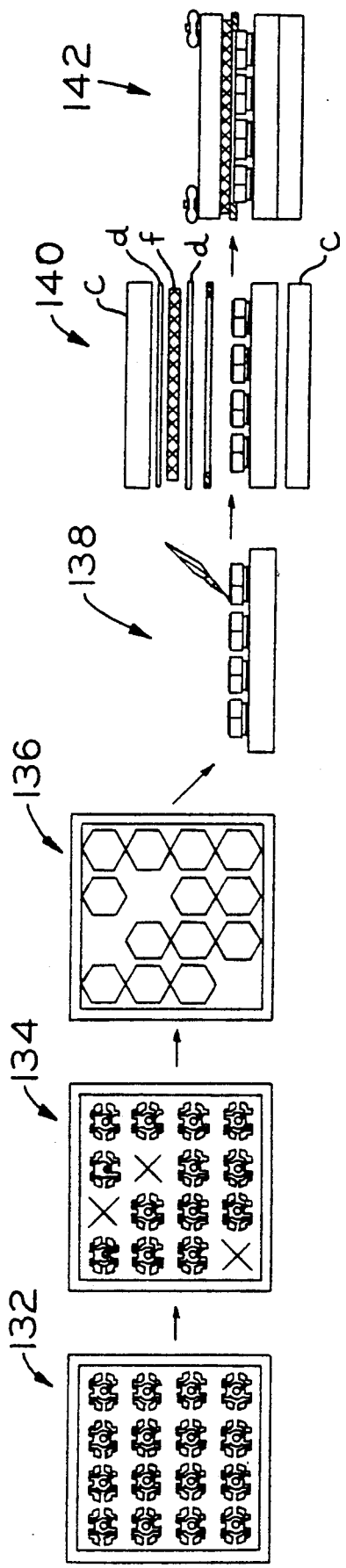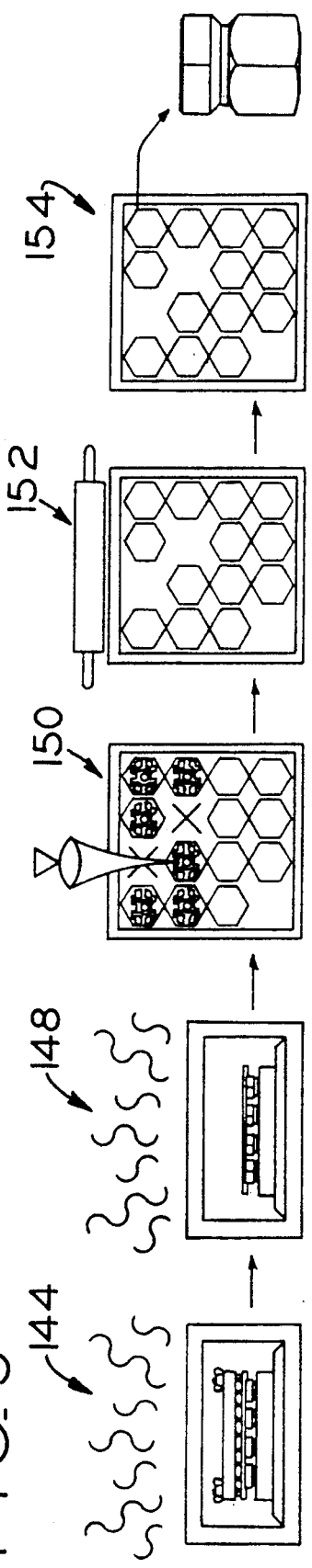

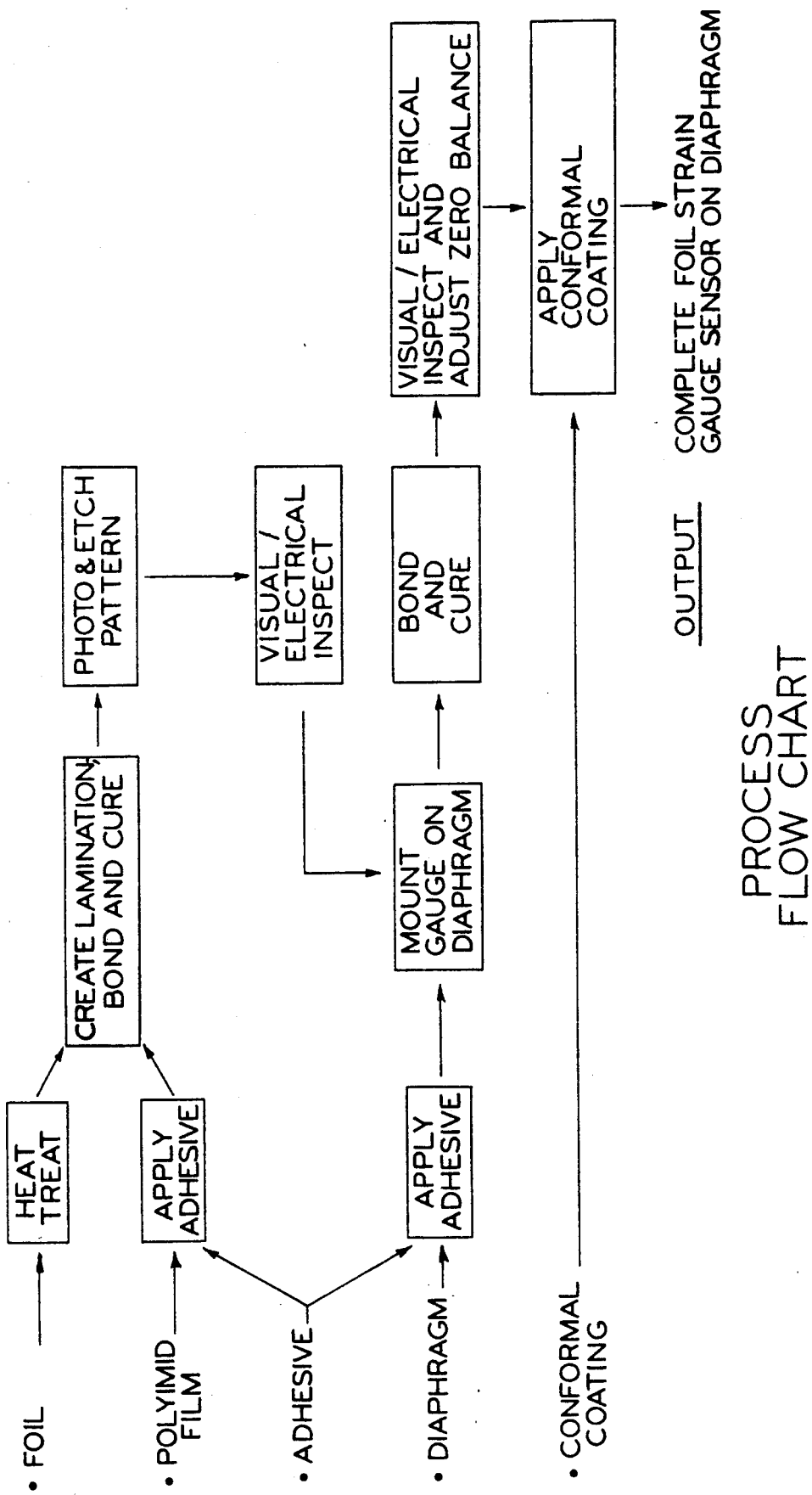

METHOD OF MAKING DIAPHRAGM-TYPE PRESSURE TRANSDUCERS

BACKGROUND OF THE INVENTION

This invention relates to diaphragm-type pressure transducers, and in particular to a method of making such transducers.

Diaphragm-type pressure transducers comprise a flexible diaphragm with a strain gauge mounted thereon. Pressure changes cause the diaphragm to flex, which is detected and measured by the strain gauge. An example of such a transducer is disclosed in Studlien, U.S. Pat. No. 4,295,116, incorporated herein by reference. Diaphragm-type pressure transducers have long been know in many different forms, and are presently in use in a wide variety of applications.

However, until the present invention, these transducers have usually been individually made. Thus they have been relatively expensive, which has to some extent limited the applications in which they are used. Moreover, the prior methods for manufacturing diaphragm-type pressure transducers have been labor intensive and time consuming, which has kept the price of diaphragm-type pressure transducers high.

SUMMARY OF THE INVENTION

It is among the objects of the present invention to provide a method of manufacturing diaphragm-type pressure transducers that is faster and less labor intensive; to provide such a method that allows the transducers to be made in batches to reduce the individual handling of the transducer; to provide such a method that is more or less continuous; to provide such a method that is cost-efficient and less expensive than the prior art methods; and to provide such a method that eliminates a lot of the individual handling of the transducers, and allows many of the necessary fabrication steps for the transducers to be done simultaneously and/or be automated.

Generally in one form the invention comprises a method of making a plurality of separate pressure transducers of the type comprising a strain gauge circuit bonded to a diaphragm. The method comprises the steps of: providing an array of a plurality of strain gauge circuits formed on a laminate sheet; providing an array of a plurality of diaphragms corresponding to the array of the strain gauge circuits; aligning the array of strain gauges with the array of diaphragms; bonding the laminate sheet to the array of diaphragms, with each strain gauge circuit aligned with a respective diaphragm; and cutting the laminate thereby forming the separate pressure transducers.

These and other features and advantages will be in part apparent and in part pointed out herein after.

BRIEF DESCRIPTION OF THE DRAWINGS

FIGS. 1A, 1B, and 1C comprise a diagrammatic flow chart of a typical existing process for manufacturing diaphragm-type pressure transducers;

FIG. 2 is a flow chart of the method of making diaphragm-type pressure transducers according to the principles of the present invention;

FIG. 3 is a diagrammatic flow chart of one alternative for the step of forming the foil/dielectric laminate;

FIG. 4 is an enlarged schematic view of the stack-up used in the first alternative for the step of forming the foil/dielectric laminate;

FIG. 7 is a diagrammatic flow chart of a portion of the process of this invention, illustrating the step of bonding the foil/dielectric laminate;

FIG. 9 is a diagrammatic flow chart of a portion of the process illustrating the step of zero-balancing the strain gauge circuit, applying a conformal coating, and separating the transducers; and FIG. 10 is a process flow chart of the method of the present invention.

Corresponding reference numerals indicate corresponding parts throughout the several views of the drawings.

DETAILED DESCRIPTION OF PREFERRED EMBODIMENTS

Figure 5:
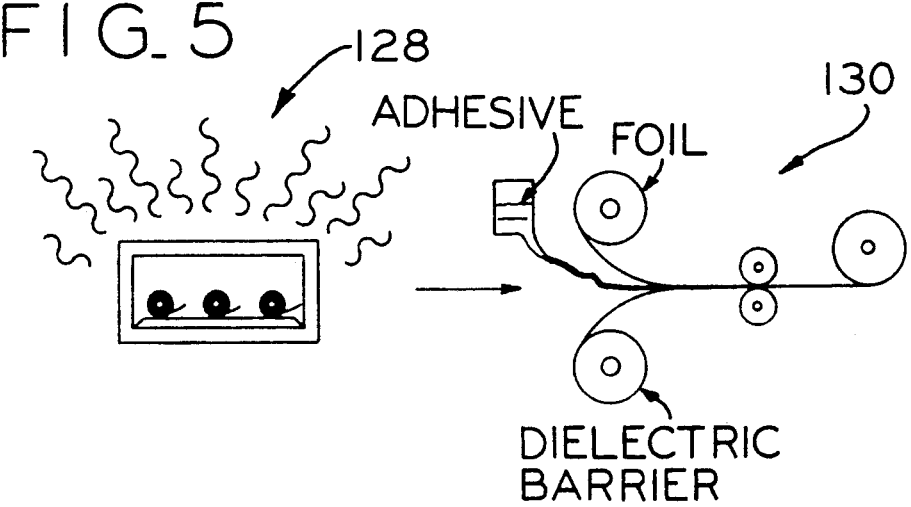
FIG. 5 is a diagrammatic flow chart of a second alternative for the step of forming the foil/dielectric laminate.

As an introduction to the description of preferred embodiments of this invention and to more clearly contrast these with the prior art, a typical existing process for manufacturing diaphragm-type pressure transducers is illustrated in FIGS. 1A, 1B, and 1C.

Referring to FIG. 1A, at 20 metal foil strips are prepared from a roll of 0.0002 inch (0.005 mm) thick constantan foil. These strips are approximately 10 inches (25.4 cm) long. At 22 the foil strips are heat treated at about 600° F.–700° F. (316° C.–371° C.) to stabilize their resistivity and temperature coefficient of resistance. At 24 the heat-treated foil strips are secured to glass plates with tape. At 26 the foil is coated with an adhesive, such as an epoxy resin type. A fixed volume of adhesive is applied to the foil, and the foil is spun to evenly distribute the adhesive over the surface of the foil to a uniform thickness. The foil is removed from the glass and, at 28 the foil a is sandwiched with a dielectric barrier layer b in a "stack-up" comprising two release layers c of Teflon ™, and two metal plates d. At 30 the stack-up is placed into a platen press where it is subjected to heat and pressure to cure the adhesive and form a foil/dielectric laminate sheet.

Referring to FIG. 1B, the stack-up is dissembled, and at 32 the foil/dielectric laminates are mounted on glass sheets with tape. At 34 the laminate is subjected to a photolithographic and etch process to form an array of strain gauge circuits in the foil on the laminate. Each circuit is typically a bridge circuit comprising a network of conductive metal lines. The etched laminate is removed from the glass sheet, and at 36 the strain gauge circuits are inspected for defects. Also at 36 the strain gauge circuits are electrically tested for defects and to make sure that their respective resistances are within an acceptable range. Defective strain gauge circuits are marked.

At 38, the resistance of the individual strain gauge circuits is manually adjusted with a cotton swab and an abrasive slurry. At 40, the individual strain gauges are manually cut out from the foil/dielectric laminate sheet.

At 42, the tops of diaphragms are manually scribed to locate their centers. At 44, an epoxy adhesive is manually applied to the diaphragms and to the strain gauges.

Referring now to FIG. 1C, at 46 the strain gauge is aligned with the diaphragm, and at 48 the strain gauge is clamped to the diaphragm. At 50 the strain gauge and diaphragm are baked at 300° F.–350° F. (149° C.–177° C.) to cure the adhesive. The clamp is removed, and at 52 the strain gauge circuit is manually balanced with a cotton swab and an abrasive slurry. At 54 the transducer is baked to stabilize the adhesive and the foil. At 56 the balance of the strain gauge circuit is rechecked, and re-balanced if necessary with a dry cotton swab. Finally, at 58 a conformal coating is manually applied for mechanical and humidity protection of the strain gauge.

A flow chart of a preferred embodiment of the present method of manufacturing diaphragm-type pressure transducers is shown in FIG. 2. As shown in FIG. 2, the method of the preferred embodiment comprises the following steps: At step 100 a foil/dielectric laminate is formed. At step 102 a plurality of strain gauge circuits are formed in the foil in the laminate. At step 104 the laminate is bonded to an array of diaphragms, with a strain gauge aligned with each diaphragm. At step 106 the zero balance of each strain gauge circuit is adjusted. At step 108 a protective conformal coating is applied over each strain gauge. At step 110 the laminate is cut to separate the individual transducers.

More specifically, as shown diagramatically in FIG. 3, the step 100 of forming the foil/dielectric laminate may include the following steps: At 112, 10 inch (25.4 cm) strips are cut from a roll of 0.0002 inch (0.005 mm) thick constantan foil. At 114, the foil strips are heat treated to stabilize their resistivity and temperature coefficient of resistance. This heat treatment is done at 570° F.–750° F. ±35° F. (299° C.–399° C. ±19° C.) for approximately 6 to twelve hours. At 116, a backing or barrier layer of dielectric material, for example a Polyimid, is laid out on a glass sheet and secured with tape. At 118, a fixed volume of epoxy adhesive is applied to the backing, and at 120 the adhesive is spread over the dielectric to a uniform thickness (about 2 mils or 0.005 mm) with a notched roller. At 122, the dielectric is baked in an oven at 225° F. (107° C.) for about 30 minutes to remove the solvent (acetone) from the adhesive layer. This dries the adhesive and reduces the thickness of the adhesive layer to about 0.4 mils (0.01 mm). The heat-treated foil is applied over the dielectric. This is conveniently done by rolling the foil on a spindle and unrolling the foil onto the dielectric to minimize the wrinkles and damage to the foil.

The foil and backing are bonded in a platen press by the application of heat and pressure. At 124 a "stack-up" is formed by sandwiching the foil and the dielectric between various layers to achieve the desired properties and characteristics in the finished laminate. This stack-up is illustrated in FIG. 4. From bottom to top, the stack-up comprises an aluminum plate e for heat transfer and flatness; a layer of Teflon TM f approximately 2 mils (0.005 mm) thick to facilitate separation of the various layers of the stack-up and provide some cushioning; a stainless steel Plate g to provide the desired surface characteristics of the laminate; another layer of Teflon TM f; a layer of 3/16 inch (5 mm) silicone rubber h to provide cushioning and to more evenly distribute pressure; another layer of Teflon TM f; a sheet of manilla cardboard i to provide the desired surface characteristics of the laminate; another layer of Teflon TM f; the dielectric j, the foil k, another layer of Teflon TM f; another steel plate g; another layer of Teflon TM f; and finally another aluminum plate e.

At 126, the stack-up is loaded into a heated platen press, and heat and pressure are applied to cure the epoxy adhesive, and control the thickness of the adhesive. the stack-up is heated at 220° F. (104° C.) for 50 minutes, and 360° F. (182° C.) for 100 minutes, all under 144 p.s.i. ($9.93 \times 10^5$ N/m$^2$) applied pressure. The laminate is removed from the stack-up, the Teflon TM sheets f facilitating the separation of the layers.

The foil/dielectric laminate may then be tested for quality. A one inch (2.54 cm) wide strip is removed from the laminate for this testing. This testing may include a 90° peel test which validates the completion of cure and the proper surface preparation prior to cure. A 90° peel test is a standard test for testing adhesive bonding by measuring the force required to peel one ply at 90° with respect to another ply. The testing may also include measurement of the thickness of the adhesive.

Preferably, as shown diagrammatically in FIG. 5, the step 100 of forming the foil/dielectric laminate is done continuously, rather than in strips as just described. At 128, rolls of 0.0002 inch (0.005 mm) constantan foil are heat treated to stabilize its resistivity and temperature coefficient of resistance. This heat treatment may be as described above for the foil strips. The backing or barrier layer of dielectric material is supplied on a roll. At 130, the rolls of the heat-treated foil and of the dielectric are unrolled and continuously bonded together. An epoxy adhesive is deposited between the foil and the dielectric before they are brought together, and the foil and dielectric pass in a continuous stream through pairs of rollers where heat and pressure are applied to the foil and dielectric to form a continuous foil/dielectric laminate, which is then collected on a roll.

Figure 6:
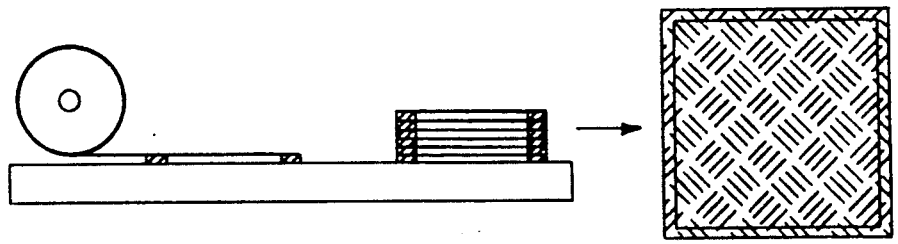
FIG. 6 is a diagrammatic flow chart illustrating the step of mounting the laminate in a frame.

Before the step 102 of forming a plurality of strain gauges in the foil in the laminate, the foil/dielectric laminate is preferably stretched over a rigid frame as illustrated diagrammatically in FIG. 6. The frame may be made of 60 mil (1.5 mm) textilite (or aluminum) with a rectangular opening of about six inches (15.2 cm) by six inches (15.2 cm). The foil/dielectric laminate can be secured to the frame with double-sided tape. This process can, of course, be automated. The frame allows the laminate to be processed without being touched. The frame also provides a reference points for aligning the laminate in subsequent steps.

The step 102 of forming a plurality of strain gauge circuits in the foil preferably comprises an industry standard photolithographic and chemical etching process illustrated diagrammatically at 132 in FIG. 7. This process forms a plurality of strain gauge bridge circuits in the foil. These strain gauge circuits are arranged in a convenient array. Since the etching process occurs after the laminate is mounted in the frame, the strain gauge circuits are precisely oriented relative to the frame, which facilitates their bonding to the diaphragms, as described below. At 134, the resulting strain gauge circuits on the laminate are visually inspected under magnification for mechanical defects in the gauge circuit, e.g., residual metal between the lines of the circuit, or insufficient metal in the lines of the circuit. The circuits are also electrically tested to make sure that their resistances are within the manufacturable tolerances. Defective gauges are identified and marked.

The step 104 of bonding the laminate to an array of diaphragms may comprise the step of providing a tray that has openings that are in registry with the positions of strain gauge circuits on the foil/dielectric laminate for receiving and holding the diaphragms, as illustrated diagrammatically at 136 in FIG. 7. The tray has an opening corresponding to each strain gauge circuit position on the laminate, but diaphragms are not loaded into tray openings that correspond to defective gauge circuits (as determined by inspection and testing).

At 138, an epoxy adhesive is applied to the diaphragms, and optionally to the dielectric side of the foil/dielectric laminate as well. The adhesive may be applied by hand, but is preferably applied in a pad printing operation. In a pad printing operation the adhesive is deposited on a plastic template which has been etched to form wells in a pattern corresponding to the array of diaphragms. The wells are approximately 0.001 inch (0.0025 cm) deep. The excess adhesive is squeegeed off, leaving islands of adhesive on the template. A soft silicone rubber pad is pressed onto the template, and when it is removed, it lifts the adhesive out of the wells while maintaining the pattern. The pad is then pressed upon the array of diaphragms to transfer the adhesive to the diaphragms. This adhesive may be the same type of epoxy adhesive used in the laminating process. The adhesive-coated foil/dielectric sheet and diaphragms are then baked at about 225° F. (107° C.) for about 30 minutes to remove the solvent from the adhesive. At 140, the foil/dielectric sheet is aligned with the diaphragms so that a strain gauge circuit is centered over each diaphragm. The frame and the tray facilitate this alignment, and even permit the alignment and bonding to be automated. A layer of Teflon ™ f is applied over the foil of the foil/dielectric sheet, a layer of 3/16 inch (4.76 mm) silicone rubber h is placed over the Teflon ™ layer, and another layer of Teflon ™ f is applied over the rubber. The Teflon ™ layers f facilitate later separation, and all three layers provide cushioning which helps to equalize pressure. At 142, the entire assembly is sandwiched between aluminum plates e for improved heat transfer and uniform application of pressure. At 144, (in FIG. 7) the assembly is heated in a platen press under pressure to bond the foil/dielectric sheet to the diaphragms as follows: The assembly is heated at 220° F. (104° C.) for 100 minutes and at 360° F. (182° C.) for 120 minutes, all under a pressure of 40 p.s.i. ($2.76 \times 10^5$ N/m²).

Figure 8:
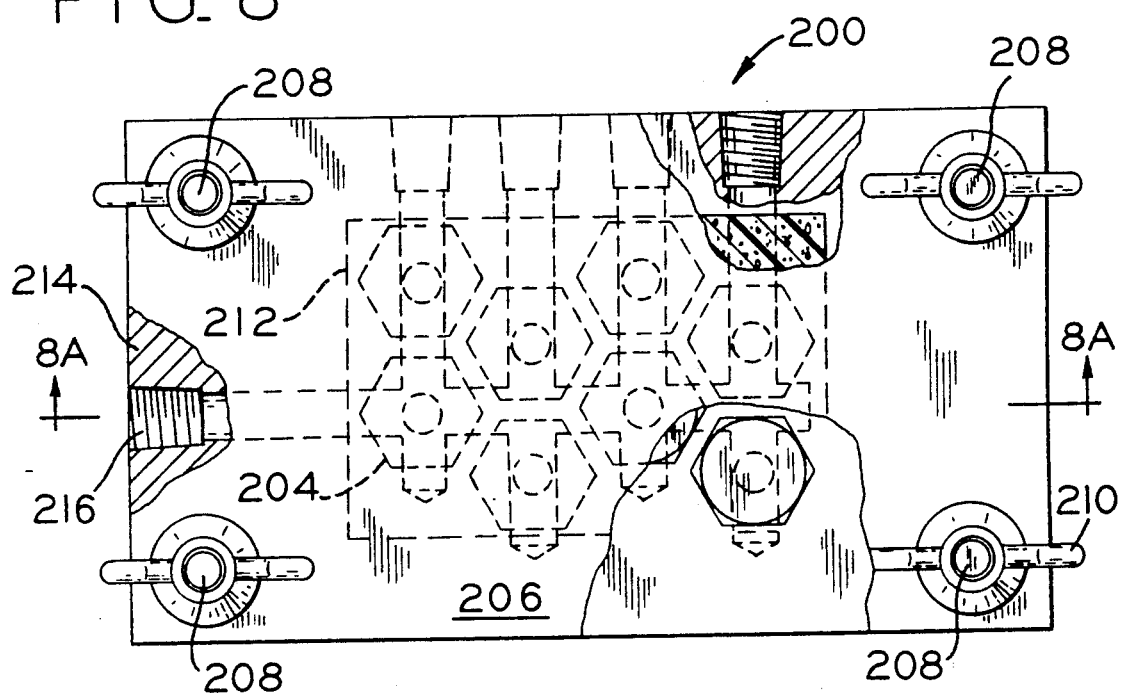
FIG. 8 is a top plan view of a tool adapted for use in bonding the strain gauge circuits to the diaphragms.
Figure 8A:
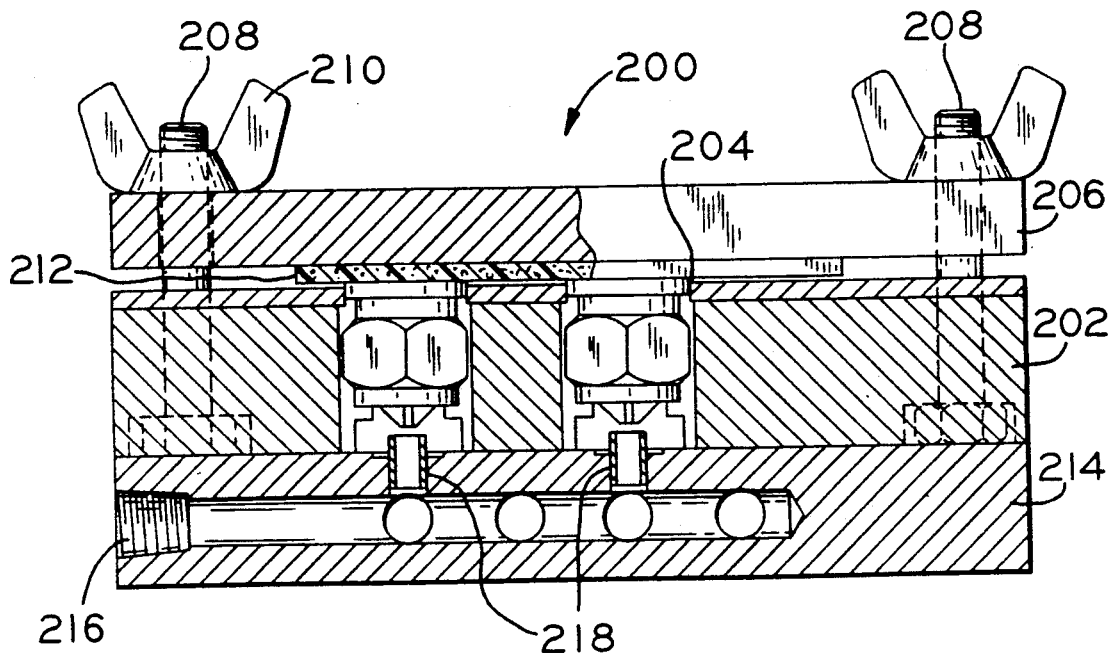
FIG. 8A is a cross-sectional view of the tool taken along the plane of line 8A—8A in FIG. 8.

Alternatively the diaphragms and the laminate sheet can be loaded into a tool 200, which is adapted to apply pressure to hold the laminate against the diaphragms to achieve a proper bond with a desired adhesive thickness. This tool is shown in FIGS. 8 and 8A. The entire tool 200 can then be heated, as described above, to cure the adhesive. The use of tools 200 facilitates the creation of a continuous process, allowing the use of an in-line oven.

The tool 200 comprises a block 202 having a plurality of hexagonal sockets 204 machined therein, the sockets 204 are arranged in an arraY corresponding to the array of strain gauge circuits on the laminate. A plate 206 is adapted to be secured over the block 202, as with bolts 208 and wing nuts 210 at their respective corners. The underside of the plate 206 has a cushioned pad 212. A base 214, having a manifold 216 therein is secured to the underside of the block 202. A flexible copper bellows 218 connects the manifold 216 with each socket 204. Thus, bonding force is applied to the diaphragms as the tool 200 is heated due to the expansion of the air in the manifold 216, which in turn causes the bellows to expand, pushing the diaphragms upwardly against the laminate and the pad 212.

At this point the foil/dielectric sheet may be cut (for example by die cutting) to separate the individual diaphragms. The edges may be trimmed on a belt sander to remove excess backing material from the transducer. However, this cutting step is preferably deferred because further fabrication steps can be more conveniently performed on the unseparated transducers.

Referring now to FIG. 9, at 148 the diaphragms are baked at about 400° F. (204° C.) for about 4 hours to stabilize and cure the adhesive. However, this further stabilization process may oxidize the terminals of the strain gauge circuit, and it may be necessary to remove the oxide from the contact points by abrasion (for example with a standard eraser).

The step 106 of adjusting the zero balance of the each strain gauge may comprise measuring and recording the zero balance of each strain gauge circuit, and overloading each pressure transducer several times to exercise and stress relieve the glue joints prior to balancing, (thereby reducing further shifts during the life of the strain gauge at extended pressures). For example, the transducers may be pressurized to 200% of their rated pressure capacity six times. This may be done automatically. After overloading, the zero-balance of each of the strain gauge circuits is again measured and recorded, which also may be done automatically. The resistance of the circuit then may be adjusted manually by mechanically abrading the strain gauge circuit with a cotton swab on a Dremel ™ toll and an abrasive powder. The abrasive contained in the commercial Product Brasso ™ (after removal of the solvents) has been found to be suitable for this purpose. The output voltage of the strain gauge circuit is monitored during the adjustment process. After balancing, the transducers are baked again at 400° F. (204° C.) for about 12 hours for a final cure, and their zero-balance is checked again.

Preferably, as illustrated diagrammatically in FIG. 9 at 150 the zero-balancing of step 106 comprises measuring the zero balance of the strain gauge circuit and adjusting the zero-balance by trimming the strain gauge with a laser. The use of a laser allows the adhesive securing the strain gauge to the diaphragm to be fully cured and stabilized before the laser trim operation. Thus no further heating step is required after the laser trim operation. Moreover, the use of a laser facilitates automating the process. A computer can control the laser to trim the circuit until the desired balance is achieved.

As illustrated at 152 in FIG. 9, the step 108 of applying a conformal coating preferably comprises screen printing the conformal coating over the strain gauges. The conformal coating may be an epoxy or some other substance that protects the strain gauge circuit from moisture and damage. The screen printing pattern is designed so that the contact points of the individual strain gauge circuits are not coated. As noted above, the laminate preferably has not yet been cut so that the conformal coating is applied over the entire uncut laminate, covering all of the strain gauges at one time. This screen printing facilitates automating the process. The conformal coating may then be cured in an oven, if necessary.

As shown at 154 in FIG. 9, the step 110 of separating the transducers is preferably done after the rest of the manufacturing process is complete, although as indicated above it could be accomplished at some earlier time after the strain gauges have been bonded to the diaphragms. The separation step preferably comprises cutting the laminate, which may be done by a simple die cutting operation.

OPERATION

FIG. 10 is a process flow chart illustrating the method of the present invention. The process starts with foil, polyimid film, adhesive, diaphragms, and conformal coating material. The foil is heat treated; adhesive is applied to the polyimid film; and a laminated is created by bonding and curing. Strain gauge circuits are formed in the laminate with a photolithographic and etch pattern. The strain gauges are inspected. Adhesive is applied to the diaphragms and the strain gauges are mounted on the diaphragm. The strain gauges are bonded and cured on the diaphragms. The strain gauges are visually and electrically inspected, and balanced. The conformal coating is applied.

According to the method of the present invention, these steps are performed in a continuous process, in a manner conducive to automation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

WHAT IS CLAIMED IS:

1. A method of making a plurality of separate pressure transducers of the type comprising a strain gauge circuit bonded to a diaphragm, the method comprising the steps of:
   providing an array of a plurality of strain gauge circuits formed in a laminate sheet;
   providing an array of a plurality of diaphragms corresponding to the array of the strain gauge circuits;
   aligning the array of strain gauge circuits with the array of diaphragms;
   bonding the laminate sheet to the array of diaphragms, with each strain gauge circuit aligned with a respective diaphragm; and
   cutting the laminate thereby forming the separate pressure transducers.

2. The method according to claim 1 wherein the step of providing the laminate sheet comprises the steps of:
   forming a laminate of metal foil and a dielectric backing; and
   forming strain gauge circuits on the laminate by a photolithographic and etch process.

3. The method according to claim 2 wherein the step of forming the strain gauges comprises mounting the laminate in a frame before the photolithographic and etch process.

4. The method according to claim 2 wherein the step of forming the laminate comprises the steps of:
   providing a roll of metal foil;
   providing a roll of dielectric backing material; and
   dispensing an adhesive between the metal foil and the dielectric backing and continuously bonding the metal foil and the dielectric backing together to form a continuous laminate strip.

5. The method according to claim 1 wherein the step of providing the laminate includes the step of mounting the laminate in a frame; wherein the step of providing the diaphragms comprises mounting the diaphragms in a tray; and wherein the step of aligning the laminate and the diaphragms comprises aligning the frame and the tray.

6. The method according to claim 1 further comprising the step of balancing the strain gauge circuits.

7. The method according to claim 1 further comprising the step of applying a conformal coating on at least portions of the strain gauge circuits.

8. The method according to claim 7 wherein the conformal coating is applied by a screen printing process.

9. The method according to claim 8 wherein the step of applying the conformal coating is done prior to the step of cutting the laminate to separate the transducers.

10. The method according to claim 1 wherein the step of cutting the laminate is done by die-cutting.

11. The method according to claim 1 further comprising the step of adjusting the zero-balance of the strain gauge circuits by trimming elements of the circuits by laser.

12. In a method of making pressure transducers of the type comprising a strain gauge circuit bonded to a diaphragm, the improvement comprising:
    bonding a laminate sheet containing an array of strain gauge circuits to a plurality of diaphragms arranged in an array corresponding to the array of the strain gauge circuits, with a strain gauge circuit aligned with a respective diaphragm.

13. The method according to claim 12 wherein the step of bonding the laminate sheet comprises:
    mounting the laminate sheet in a frame;
    mounting the diaphragms in a tray; and
    aligning the frame with the tray to align the strain gauge circuits with the diaphragms.

14. The method according to claim 12 wherein the improvement further comprises applying a conformal coating over the strain gauge circuits on the laminate sheet by screen printing.

15. A method of making pressure transducers of the type comprising a strain gauge circuit bonded to a diaphragm, the method comprising the steps of:
    preparing a metal foil/dielectric laminate sheet;
    etching a plurality of strain gauge circuits, arranged in an array, from the metal foil in the laminate sheet;
    arranging a plurality of diaphragms in an array corresponding to the array of strain gauge circuits on the laminate sheet;
    aligning the laminate sheet with the array of diaphragms;
    bonding the laminate sheet to the array of diaphragms, with each strain gauge pattern aligned with a diaphragm; and
    cutting the laminate sheet to separate the transducers.

16. The method according to claim 15 further comprising the step of mounting the laminate in a frame before the etching step.

17. The method according to claim 16 wherein the step of arranging the diaphragms comprises loading diaphragms into a tray having Positions corresponding to the positions of the strain gauge circuits on the laminate sheet, and wherein the step of aligning the laminate sheet and the diaphragms comprises aligning the frame with the tray.

18. The method according to claim 17 further comprising the step of inspecting each of the strain gauge circuits on the laminate sheet, and only putting diaphragms in positions in the tray corresponding to strain gauge patterns that pass inspection.

19. The method according to claim 15 further comprising the step of applying a conformal coating over portions of the strain gauge circuit.

20. The method according to claim 19 wherein the conformal coating is applied by screen printing leaving at least some contact points on the strain gauge circuits uncoated.

21. The method according to claim 15 wherein the step of preparing a metal foil dielectric composite laminate sheet comprises the steps of:
providing a layer of dielectric material;
providing a layer of metal foil;
heat treating the metal foil to stabilize its resistivity;
applying a layer of adhesive on at least one of the layer of dielectric material and the layer of metal foil; and
bonding the layer of dielectric material and the layer of metal foil by applying heat and pressure.

22. The method according to claim 21 wherein the step of heat treating the metal foil to stabilize its resistivity comprises heat treating the metal foil in a roll.

23. The method according to claim 15 wherein the step of forming the laminate comprises the steps of:
providing a roll of metal foil;
providing a roll of dielectric backing material; and
dispensing an adhesive between the metal foil and the dielectric backing and continuously bonding the metal foil and the dielectric backing together to form a continuous laminate strip.

24. The method according to claim 15 wherein the step of etching a plurality of strain gauge circuits from the metal foil in the laminate sheet is done by photolithography.

25. A method of making a pressure transducers of the type comprising a strain gauge circuit bonded to a diaphragm, the method comprising the steps of:
preparing a metal foil/dielectric laminate sheet in a continuous strip;
mounting segments of the laminate sheet in frames;
etching a plurality of strain gauge circuits, arranged in an array from the metal foil in the laminate sheet;
providing a tray with positions corresponding to the positions of the strain gauge circuits in the array and loading diaphragms into the tray;
aligning the frame and the tray to align a strain gauge circuit with a corresponding diaphragm;
bonding the laminate sheet t the diaphragms; and
cutting the laminate sheet to separate the transducers.

26. The method according to claim 25 further comprising the step of adjusting the electrical properties of the strain gauge circuits including monitoring the electrical properties of the circuit, and automatically trimming the circuits with a laser to adjust the monitored electrical properties.

27. The method according to claim 25 further comprising the step of testing the strain gauge circuits on the laminate sheet to identify defective strain gauge circuits, and wherein diaphragms are not loaded into tray positions corresponding to a defective strain gauge circuit.

28. The method according to claim 25 further comprising the step of screen printing a conformal coating over portions of each strain gauge circuit before the step of cutting.

29. The method according to claim 25 wherein the laminate is cut by die-cutting.

30. The method according to claim 25 wherein each step is automated.

* * * * *